United States Patent
Yoon et al.

(10) Patent No.: US 10,177,388 B2
(45) Date of Patent: Jan. 8, 2019

(54) CATHODE SUBSTRATE, HIGH-CAPACITY ALL-SOLID-STATE BATTERY AND METHOD OF MANUFACTURING SAME

(71) Applicant: GACHON UNIVERSITY OF INDUSTRY-ACADEMIC COOPERATION FOUNDATION, Seongnam-Si, Gyeonggi-Do (KR)

(72) Inventors: Young Soo Yoon, Seoul (KR); Seung Hyun Jee, Seoul (KR); Seok Hee Lee, Seoul (KR)

(73) Assignee: GACHON UNIVERSITY OF INDUSTRY—ACADEMIC COOPERATION FOUNDATION (KR)

(*) Notice: Subject to any disclaimer, the term of this patent is extended or adjusted under 35 U.S.C. 154(b) by 250 days.

(21) Appl. No.: 14/906,262

(22) PCT Filed: Apr. 16, 2014

(86) PCT No.: PCT/KR2014/003294
§ 371 (c)(1),
(2) Date: Jan. 19, 2016

(87) PCT Pub. No.: WO2015/008926
PCT Pub. Date: Jan. 22, 2015

(65) Prior Publication Data
US 2016/0164105 A1    Jun. 9, 2016

(30) Foreign Application Priority Data

Jul. 19, 2013 (KR) .......... 10-2013-0085465

(51) Int. Cl.
*H01M 4/74* (2006.01)
*H01M 4/04* (2006.01)
(Continued)

(52) U.S. Cl.
CPC .......... *H01M 4/74* (2013.01); *H01M 4/0416* (2013.01); *H01M 4/131* (2013.01); *H01M 4/136* (2013.01);
(Continued)

(58) Field of Classification Search
CPC .......... H01M 4/74; H01M 4/485; H01M 4/48; H01M 4/1397; H01M 4/13; H01M 4/669;
(Continued)

(56) References Cited

U.S. PATENT DOCUMENTS 4,212,714 A * 7/1980 Coker ............... C25B 1/46
  204/263
6,368,746 B1 * 4/2002 Takada ............... H01M 4/13
  252/182.1
(Continued)

FOREIGN PATENT DOCUMENTS

CN  10165666       * 7/2009 ............ H01M 4/02
JP  2000123874      4/2000
(Continued)

OTHER PUBLICATIONS

International Search Report and Written Opinion for PCT/KR2014/003294 dated Jul. 14, 2014.

*Primary Examiner* — Jonathan G Leong
*Assistant Examiner* — Aaron J Greso
(74) *Attorney, Agent, or Firm* — Renaissance IP Law Group LLP

(57) ABSTRACT

Provided are a cathode substrate, a high capacity all-solid-state battery, and a method for manufacturing the same. The cathode substrate includes a base in a mesh form and a cathode formed on the base, wherein the cathode is configured to overlap the base. The present invention may resolve a conventional problem of deterioration in battery efficiency, which has been caused by a long distance between an (Continued)

electrode and a cathode, and may produce a high capacity all-solid-state battery while suppressing or preventing an increase in the thickness of the cathode.

6 Claims, 6 Drawing Sheets

(51) Int. Cl.

| | | |
|---|---|---|
| H01M 4/131 | (2010.01) | |
| H01M 4/136 | (2010.01) | |
| H01M 4/1391 | (2010.01) | |
| H01M 4/505 | (2010.01) | |
| H01M 4/525 | (2010.01) | |
| H01M 10/052 | (2010.01) | |
| H01M 10/0562 | (2010.01) | |
| H01M 4/485 | (2010.01) | |
| H01M 10/0525 | (2010.01) | |
| H01M 4/1397 | (2010.01) | |
| H01M 4/58 | (2010.01) | |
| H01M 4/66 | (2006.01) | |

(52) U.S. Cl.
CPC ....... *H01M 4/1391* (2013.01); *H01M 4/1397* (2013.01); *H01M 4/485* (2013.01); *H01M 4/505* (2013.01); *H01M 4/525* (2013.01); *H01M 4/5825* (2013.01); *H01M 4/669* (2013.01); *H01M 4/747* (2013.01); *H01M 10/052* (2013.01); *H01M 10/0525* (2013.01); *H01M 10/0562* (2013.01); *H01M 4/0404* (2013.01); *H01M 2220/30* (2013.01)

(58) Field of Classification Search
CPC .......... H01M 4/66; H01M 4/505; H01M 4/50; H01M 4/136; H01M 4/525; H01M 4/52; H01M 4/5825; H01M 4/58; H01M 4/131; H01M 4/747; H01M 4/1391; H01M 4/0416; H01M 4/04; H01M 4/0404; H01M 10/052; H01M 10/05; H01M 10/0562; H01M 10/0525; H01M 2220/30
See application file for complete search history.

(56) References Cited

U.S. PATENT DOCUMENTS

| | | | |
|---|---|---|---|
| 6,679,926 B1 * | 1/2004 | Kajiura | H01M 4/0402 264/614 |
| 2002/0122984 A1 * | 9/2002 | Sakai | C01G 37/006 429/231.1 |
| 2012/0115035 A1 | 5/2012 | Ota et al. | |
| 2012/0156571 A1 * | 6/2012 | Kawamoto | H01M 10/0525 429/306 |
| 2013/0108802 A1 * | 5/2013 | Oladeji | H01M 4/0471 427/565 |

FOREIGN PATENT DOCUMENTS

| | | | |
|---|---|---|---|
| JP | 200884851 | 4/2008 | |
| JP | 4280339 | * 6/2009 | ............... H01B 1/06 |
| JP | 2010170972 | 8/2010 | |
| KR | 19970004137 | 3/1997 | |
| KR | 20060008049 | 1/2006 | |
| KR | 20100098543 | 9/2010 | |
| KR | 20100121387 | 11/2010 | |
| KR | 20120010552 | 2/2012 | |

* cited by examiner

CATHODE          SOLID         CONDUCTIVE
ACTIVE MATERIAL  ELECTROLYTE   MATERIAL

CATHODE SUBSTRATE, HIGH-CAPACITY ALL-SOLID-STATE BATTERY AND METHOD OF MANUFACTURING SAME

TECHNICAL FIELD

The present invention relates to a cathode substrate, a high capacity all-solid-state battery, and a method for manufacturing the same, and particularly, to a cathode substrate capable of increasing battery capacity by increasing the amount of a cathode in a predetermined volume, a high capacity all-solid-state battery, and a method for manufacturing the same.

BACKGROUND ART

Compact and lightweight electrical/electronic devices such as cellular phones, laptops, and computers are actively developed and produced with the development of high technology, and such portable electrical/electronic devices require highly efficient batteries for supplying power thereto. Therefore, it is necessary to develop a highly efficient, ultra-compact, and ultra-light battery. Particularly, all solid-state lithium secondary batteries satisfy such conditions while being able to be charged and discharged in consideration of economic aspects.

The all-solid-state lithium batteries can be manufactured in any size and form, and can maximize electrode/electrolyte interfacial adhesion properties by applying a solid electrolyte with a thickness of a few μm or less on an electrode using a thin film deposition technique. Furthermore, the all-solid-state lithium batteries do not generate heat or gaseous products during operation and thus have a high stability as compared to when a liquid electrolyte is used. The all-solid-state lithium batteries do not cause contamination or leakage problems, have a low electronic conductivity, and thus have an advantage of no self-discharge.

Due to these advantages, it is expected that use of the chargeable/dischargeable all-solid-state lithium secondary batteries will gradually expand. Particularly, with the increase in demands for secondary batteries, which can be used in ultra-compact devices, electrical devices, smart cards, and microelectromechanical systems (MEMS) that require ultra-compact batteries, researches on all-solid-state lithium secondary batteries are rapidly increasing.

Thus, various methods for developing a high capacity all-solid-state lithium secondary battery have been attempted, and particularly, methods for increasing the area or thickness of a cathode have been attempted in order to increase the capacity of the all-solid-state lithium secondary battery. This is because energy density, reversibility, and discharge rate, which are important factors for the efficiency of a general all-solid-state lithium secondary battery, are determined by a cathode material among components of a battery. Therefore, in order to use a battery for a long time with a high energy density, the development of a suitable cathode material is important, and particularly, it is necessary to increase the thickness of a cathode.

Thus, conventionally, as disclosed in KR Patent Publication No. 10-2006-0008049, an electrode for a lithium secondary micro battery and a method for manufacturing the same, the electrode having a thick electrode active material layer formed by applying, on a substrate, a slurry which is formed by mixing electrode active material powder and a sol solution including at least one electrode active material precursor compound respectively including metal elements constituting the electrode active material, are suggested as a technique relating to an electrode for a lithium secondary micro battery providing a high capacity electrode by forming a film thicker than a thin film.

A technique for forming a thick cathode may have an effect of increasing the capacity of a battery due to an increase in the cathode capacity of the battery. However, an increase in the thickness of a cathode results in a decrease in fast charging-discharging efficiency due to the internal resistance, and the like.

Also, when a cathode is manufactured into a thick layer having a thickness of 100 μm or more in order to increase the cathode capacity of a battery, the surface roughness of the cathode increases, thus causing a problem of reducing adhesion properties between the cathode and a solid electrolyte.

Therefore, there is a need for a technique relating to a cathode substrate for an all-solid-state lithium secondary battery, the cathode substrate being capable of increasing the capacity of the battery while having the same thickness as in a conventional substrate, and being capable of decreasing a conduction distance between an electrode and a cathode material.

DISCLOSURE OF THE INVENTION

Technical Problem

The present invention provides a cathode substrate capable of decreasing a conduction distance between an electrode and a cathode material, a high capacity all-solid-state battery, and a method for manufacturing the same.

The present invention provides a cathode substrate capable of improving the electrical properties of a battery, a high capacity all-solid-state battery, and a method for manufacturing the same.

The present invention provides a cathode substrate capable of increasing the capacity of a battery even in the same volume as in a conventional thin film battery, a high capacity all-solid-state battery, and a method for manufacturing the same.

Technical Solution

A cathode substrate according to an embodiment of the present invention is capable of increasing the capacity of an all-solid-state battery, and includes a base in a mesh form and a cathode formed on the base, wherein the cathode is configured to overlap the base.

The base may be formed of a material having heat resistance, corrosion resistance, and electronic conductivity, and the material may include SUS.

The cathode substrate may include a cathode active material, a solid electrolyte, and a conductive material.

The cathode substrate may have a thickness of 50 to 80 μm.

A method for manufacturing a cathode substrate according to an embodiment of the present invention includes a) preparing a base in a mesh form, b) preparing a cathode slurry including a cathode active material, a solid electrolyte, and a conductive material, c) applying the cathode slurry on the base to form a cathode, and d) drying and compressing the cathode slurry.

The cathode slurry may be formed by mixing the cathode active material, the solid electrolyte, and the conductive material with an organic solvent and a binder.

At least any one of $LiCoO_2$, $LiNiO_2$, $LiMn_2O_4$, $LiMnO_2$, $LiCoPO_4$, or a compound thereof is used as the cathode active material.

At least any one of an Li—La-metal-O system, an Li—B—O system, or an Li—P—O system, which is a crystalline electrolyte or an amorphous electrolyte, is used as the solid electrolyte.

Drying in a temperature range of 500 to 1,200° C. and compressing in a pressure range of 700 to 1,200 $kg/m^2$ for 5 minutes to 2 hours may be performed in step d).

Prior to the drying and the compressing in the temperature and pressure ranges, preliminary drying and compressing may be further performed in a temperature range of 50 to 120° C. and in a pressure range of lower than 700 to 1,200 $kg/m^2$.

An all-solid-state battery according to an embodiment of the present invention includes the cathode substrate produced by the method of claims 5, an electrolyte layer formed on at least one surface of a cathode included in the cathode substrate, an anode formed on the solid electrolyte, and an anode current collector formed on the anode.

A method for manufacturing an all-solid-state battery according to an embodiment of the present invention includes preparing a cathode substrate produced by the method of any one of claims 5, forming an electrolyte layer on at least one surface of the cathode substrate, forming an anode on the electrolyte layer, and forming an anode current collector on the anode.

Advantageous Effects

According to a cathode substrate, a high capacity all-solid-state battery, and a method for manufacturing the same in accordance with embodiments of the present invention, a substrate for a thin film battery is produced including a cathode material, so that the substrate may be used as a cathode and the capacity of the all-solid-state battery may thus be increased.

That is, a slurry including a cathode material is coated on a base which has a mesh form made of a metal, so that empty spaces in the mesh base are filled with the cathode slurry to form a cathode substrate. Thus, the cathode substrate may act as a substrate and a cathode at the same time, thereby being capable of increasing the capacity of a battery even in a battery having the same volume as in a conventional battery. Therefore, the cathode substrate of the present invention is capable of decreasing a conductive distance between an electrode and a cathode, and thus increasing the electric conductivity of the cathode.

Therefore, the present invention may resolve a conventional problem of deterioration in battery efficiency, which has been caused by a long distance between an electrode and a cathode, and may produce a high capacity all-solid-state battery while suppressing or preventing an increase in the thickness of the cathode.

MODE FOR CARRYING OUT THE INVENTION

Figure 1:
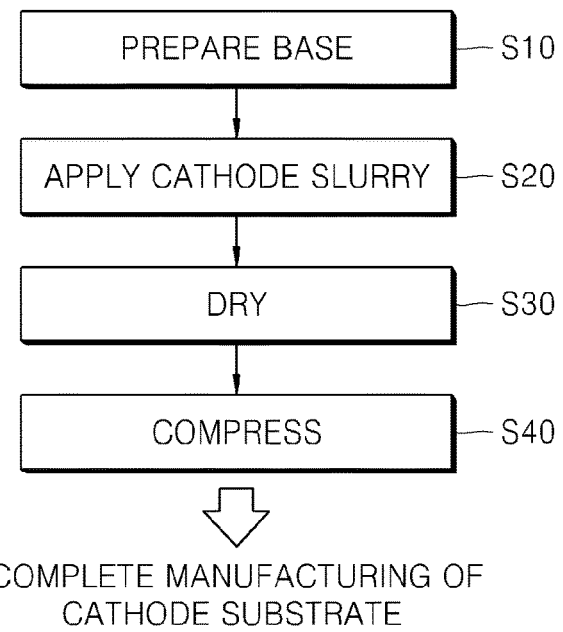
FIG. 1 is a flow chart illustrating a method for a cathode substrate according to an embodiment of the present invention.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, like reference numerals refer to like elements throughout.

Figure 2:
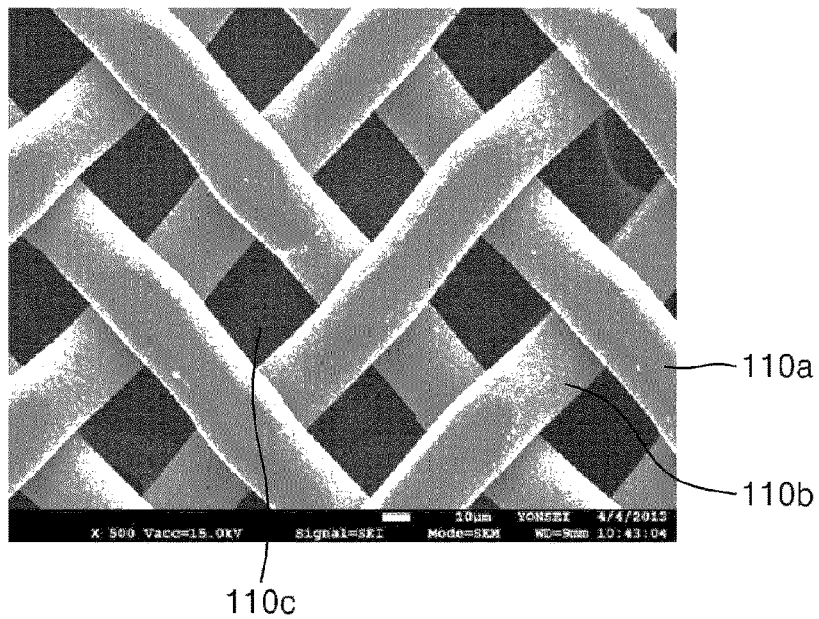
FIG. 2 shows an SEM image of a base constituting a cathode substrate of the present invention.
Figure 3:
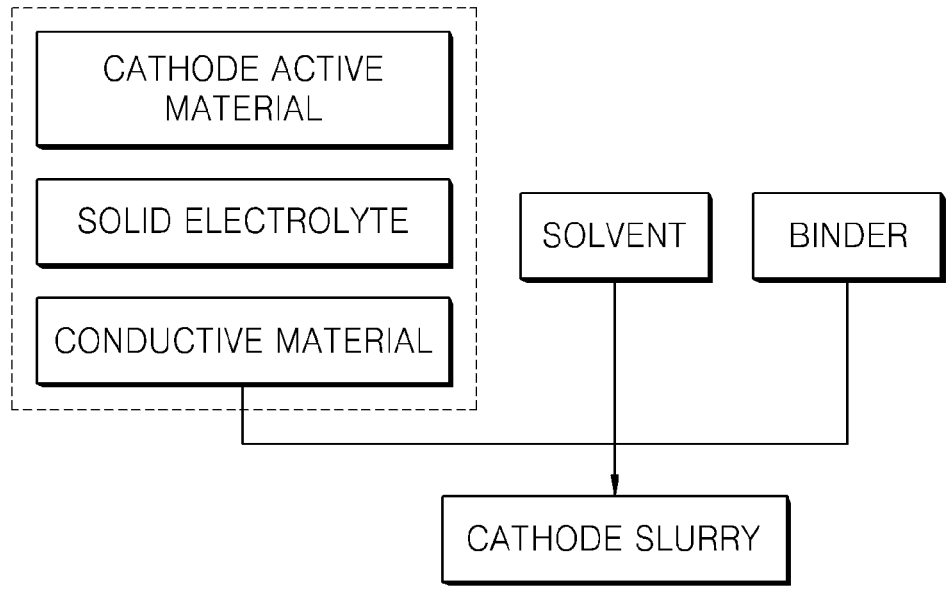
FIG. 3 is a flow chart illustrating a method for preparing a cathode slurry constituting the cathode substrate in FIG. 1.
Figure 4:
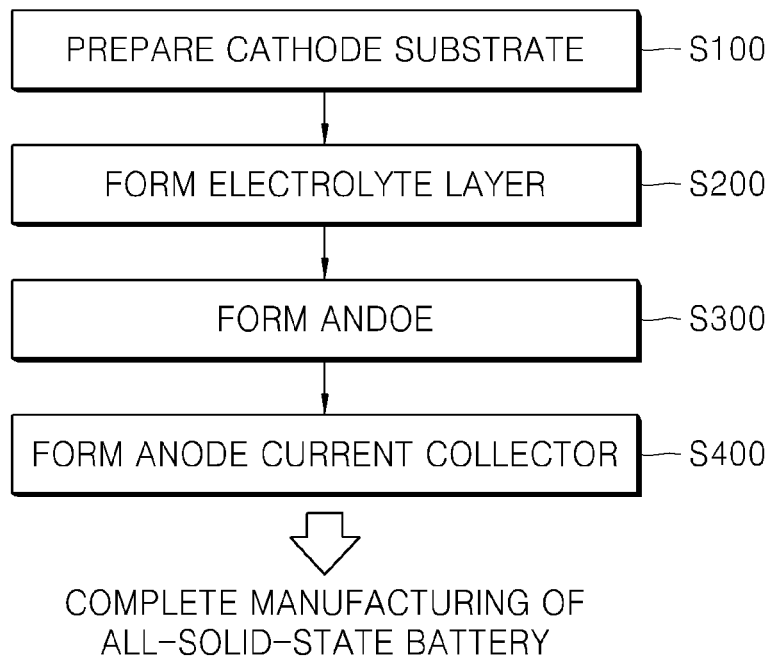
FIG. 4 is a flow chart illustrating an all-solid-state battery which is provided with a cathode substrate according to an embodiment of the present invention.
Figure 5A:
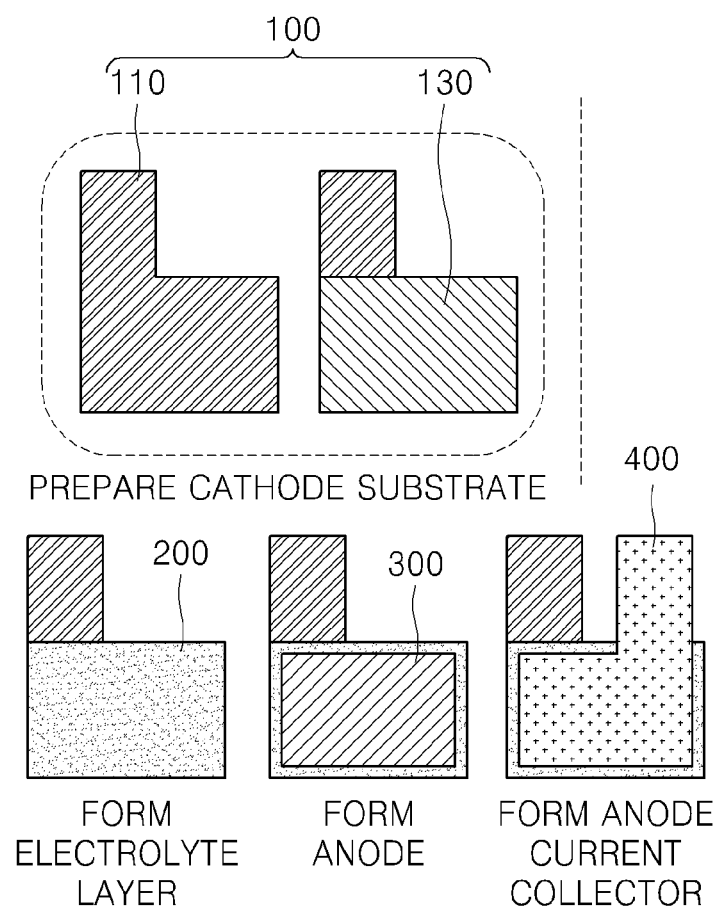
FIGS. 5A and 5B are a process diagram of an all-solid-state battery according to an embodiment of the present invention and a sectional view thereof.
Figure 5B:
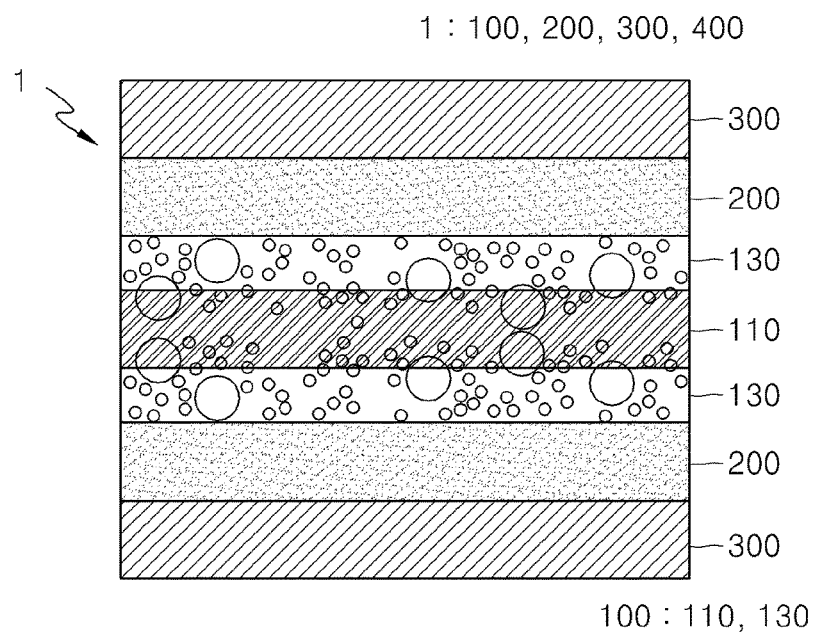

FIG. 1 is a flow chart illustrating a method for a cathode substrate according to an embodiment of the present invention. FIG. 2 shows an SEM image of a base constituting a cathode substrate of the present invention. FIG. 3 is a flow chart illustrating a method for preparing a cathode slurry constituting the cathode substrate in FIG. 1. FIG. 4 is a flow chart illustrating an all-solid-state battery which is provided with a cathode substrate according to an embodiment of the present invention. FIGS. 5A and 5B are a process diagram of an all-solid-statebattery according to an embodiment of the present invention and a sectional view thereof.

The cathode substrate 100 according to an embodiment of the present invention is capable of increasing the capacity of an all-solid-state battery, and includes a base 110 in a mesh form and a cathode 130 formed on the base 110. The cathode 130 is configured to overlap the base 110.

The base 110 serves to stably support an object and to configure an all-solid-state battery. In the present invention, the base 110 has a mesh form so as to provide the cathode 130 overlapping the base 110 on which a cathode slurry is applied. Thus, the cathode slurry may be applied on the base 110 while filling empty spaces in the base 110. The base 110 may be formed of stainless steel (SUS), which has excellent properties in terms of deformation or warping and can withstand high temperature and pressure during subsequent pressing of the cathode substrate. Furthermore, it is preferable that the base is formed of a material having electronic conductivity in order to facilitate a connection between an electrode and the cathode. However, the material of the base 110 is not limited to SUS, but may be a metal (e.g. Ti, Cr, Ni, Cu, Au, etc.) having excellent heat resistance, corrosion resistance, and electronic conductivity.

The cathode 130 is configured to overlap the base, and is applied as a slurry on the base 110. The cathode includes a cathode active material, a solid electrolyte, and a conductive material. The cathode active material may be any one selected from the group consisting of $LiCoO_2$, $LiNiO_2$, $LiMn_2O_4$, $LiMnO_2$, $LiCoPO_4$, and a compound thereof, which are in the form of powder.

The solid electrolyte is included in the cathode in order to facilitate ionic conduction in the cathode, and may include a crystalline electrolyte or an amorphous electrolyte. The solid electrolyte may be at least any one of an Li—La-metal-O system, an Li—B—O system, or an Li—P—O system. That is, the solid electrolyte may be included in the cathode material in order to resolve such a problem that ionic conduction does not occur to the inside of the cathode (that is, in order to facilitate ionic conduction to the inside of the cathode substrate) when the cathode thickness of the cathode substrate 100 is large.

Although not particularly limited, the conductive material is preferably carbon black. Examples of the carbon black may include acetylene black, ketjen black, carbon fiber (VGCF), carbon nanotube (CNT), graphite, soft carbon, hard carbon, and the like. That is, one of the aforementioned materials may be used alone, or two or more may be used in combination. That is, the conductive material may be used to give a sufficient current collecting effect as a cathode material.

Hereinafter, a method for manufacturing the cathode substrate 100 including the metal base 110 and the cathode 130 will be described.

Referring FIG. 1, the method for manufacturing the cathode substrate according to an embodiment of the present invention includes preparing the base 110 in a mesh form, preparing a cathode slurry, and applying the cathode slurry on the base 110 to form the cathode 130.

First, referring to FIG. 2, a metal material having excellent heat resistance, corrosion resistance, and electronic conductivity is selected to prepare the base 110 in a mesh form (S10). The base 110 is prepared in a mesh form while first lines 110a and second lines 110b intersecting each other, with the first lines extending in one direction and the second lines extending a direction intersecting the one direction. In the present invention, the first and second lines 110a and 110b were configured to have a thickness of 20 μm or less and to have spaces 110c having a spaced length being 20 μm or less between the plurality of lines. However, the thickness of the first and second lines 110a and 110b, and the spaced length of the spaces 110c between the lines 110a and 110b are not limited to the aforementioned thickness and length, but may be variously changed by a person skilled in the art.

After the preparing of the base 110 in a mesh form, a cathode slurry including a cathode active material, a solid electrolyte, and a conductive material is prepared and applied on the base to form a cathode (S20). In this case, as illustrated in FIG. 2, the cathode slurry may be prepared by mixing a cathode active material, a solid electrolyte, and a conductive material with a solvent and a binder.

The binder may be, for example, any one selected from the group consisting of polyvinylidene fluoride (PVDF), polytetrafluoroethylene (PTFE), polyimide (PI), polyamide, poly amideimide, polyacrylate, styrene-butadiene rubber (SBR), styrene-ethylene-butylene-styrene copolymer (SEBS), carboxymethyl cellulose (CMC), and the like, or two or more thereof in combination.

The solvent is added to a mixture containing the cathode active material, the solid electrolyte, the conductive material, and the binder to make the mixture into a slurry. N-methyl-2-pyrrolidone (NMP), water, alcohol, xylene, toluene, or the like may be used as the solvent.

A cathode active material, a solid electrolyte, and a conductive material, which are included in a cathode material, are mixed at a predetermined ratio in an organic solvent and a binder, and may be prepared into a slurry by a ball milling process. The cathode active material, the solid electrolyte, and the conductive material may be mixed at a ratio of 8:1.7:0.3 in NMP as a solvent and PVDF as a binder. The binder may be included by 10% or less with respect to the amount of the slurry. The resultant mixture is subjected to a ball milling process for 24 hours or more at 100 rpm to produce a cathode slurry. However, the ratio in the cathode material is not limited to thereto, but may be variously changed by a person skilled in the art.

That is, in the present invention, the ratio in the cathode material and the content of solvent and binder for preparing a cathode slurry are not limited, but its importance lies in the features that the cathode substrate 100 is configured with the base 110 and the cathode 130 overlapping each other and the cathode substrate 100 acts as a cathode in an all-solid-state battery 1.

The cathode slurry formed in this manner may be applied on the base 110 by means of a doctor blade which is one of screen printing methods. More particularly, in the doctor blade method, a thin plate made of a metal or a resin contacts a cylindrical plate, and then push ink into recesses and scrape excess ink in other than the recesses. Thus, in the present invention, the cathode slurry may be pushed into empty spaces in the base 110 while being scraped from the surface of the mesh base 110. In the doctor blade process, contacting pressure and angle when scraping a coating material, and shapes or sizes of recesses in the plate may be changed according to the type or characteristics of the coating material, viscosity, and desired precision. However, in the present invention, process conditions in the doctor blade process are not limited. After the cathode slurry is applied on the base 110 by the above screen printing method, the cathode substrate 100 may have a thickness of 100 μm or more.

After the cathode slurry is applied, drying and compressing the cathode slurry may be further performed (S30 and S40). That is, the drying S30 may be performed to evaporate the solvent included in the cathode slurry applied on the base 110, and the compressing S40 may be performed to minimize the surface roughness of the cathode substrate 100. In this case, the drying may be performed in a temperature range of 500 to 1,200° C. and the compressing may be performed in a pressure range of 700 to 1,200 kg/m$^2$ for 5 minutes to 2 hours. Thus, the drying and the compressing allow the produced cathode substrate 100 to have an increased packing density of the cathode material in the spaces in the base 110 and to have a more uniform surface. By minimizing the roughness of the cathode substrate 100, a solid electrolyte layer 200 may be easily deposited on the cathode substrate 100.

Prior to the drying and the compressing in the temperature and pressure ranges, preliminary drying and compressing may be performed. That is, the preliminary drying and compressing may be performed in order to suppress or prevent deformation of the cathode material and the base 110 under the heat-generating process condition. The preliminary drying and compressing may be performed in a temperature range of 50 to 120° C. and in a pressure range of lower than the aforementioned pressure range. When the preliminary drying and compressing are performed, main drying and compressing may be performed for a shorter time than without the preliminary drying and compressing.

The cathode substrate 100 has a reduced thickness after the drying and the compressing as compared to before the drying and the compressing. For example, in the present invention, it could be seen that the thickness of the cathode substrate 100 was 120 μm before the drying and the compressing, but the thickness of the cathode substrate 100 decreased to 80 μm after the drying and the compressing. Thus, the thickness of the cathode substrate 100 may decrease by performing the drying and compressing, because the solvent evaporates by the drying and the density thereof increases by the compressing. That is, the cathode substrate 100 of the present invention may be prepared to have a thickness of about 50 to 80 μm including the base 110 and the cathode 130.

After the drying and the compressing (S30), a step for polishing the surface of the cathode substrate 100 may further performed prior to the deposition of an electrolyte layer 200. Thus, the surface roughness of the cathode substrate 100 on which the electrolyte layer 200 is deposited may be minimized by polishing the cathode substrate 100.

According to the aforementioned method, the cathode slurry is applied on the base 110, and then the drying and the compressing are performed in the range of predetermined temperature and pressure to prepare the cathode substrate 100 (S100). Subsequently, an electrolyte layer 200, an anode 300, and an anode current collector 400 are formed on the cathode substrate 100 in order to manufacture an all-solid-state battery according to an embodiment of the present invention (S200, S300, and S400).

Referring to FIGS. 4 and 5, the cathode substrate 100 is prepared, and then a step S200 for forming the electrolyte layer 200 on the cathode substrate 100 is performed. Since the electrolyte layer 200 is disposed between the cathode substrate 100 and the anode 300, the electrolyte layer 200 should have a low interfacial resistance. The electrolyte layer 200 may be formed using an inorganic solid electrolyte or an organic solid electrolyte. The inorganic solid electrolyte as a ceramic material may be $Li_2O$—$B_2O_3$, $Li_2O$—$V_2O_5$—$SiO_2$, $Li_2SO_4$—$Li_2O$—$B_2O_3$, $Li_3PO_4$, $Li_2O$—$Li_2WO_4$—$B_2O_3$, LiPON, LiBON, or the like, which may be used alone or in combination of at least one thereof. The organic solid electrolyte may be a mixture of a lithium salt and a polymeric material such as a polyethylene derivative, a polyethylene oxide derivative, a polypropylene oxide derivative, a phosphoric ester polymer, poly agitation lysine, polyester sulfide, polyvinyl alcohol, and polyvinylidene fluoride. In this case, these may be used alone or in combination of at least one thereof.

The electrolyte layer 200 may be formed on the cathode substrate 100 by means of apparatus and technique commonly used for thin film growth in a semiconductor process. Examples of the technique include radio frequency (RF) magnetron sputter, direct current (DC) magnetron sputter, e-beam evaporator, thermal evaporator, chemical vapor deposition (CVD), pulsed laser deposition (PLD), and sol-gel methods. In this Example, in order to deposit a LiPON layer as the electrolyte layer 200, the deposition may be performed using a RF magnetron sputtering apparatus, which is capable of providing a highly efficient and easy process, under the condition in table 1 below.

TABLE 1

Electrolyte Layer Deposition Process Condition

| Process Condition | | Example |
| --- | --- | --- |
| Pressure (m torr) | Initial Pressure | $5 \times 10^6$ |
| | Process Pressure | 5 |
| Target | Material | $Li_3PO_4$ |
| | Diameter (cm) | 5.08 |
| RF Power (W) | | 100 |
| $N_2$ reaction gas flow rate (sccm) | | 50 |

Under the above process condition, the electrolyte layer 200 is formed on the smooth surface of the cathode substrate 100 by the drying and the compressing, which are performed prior to the deposition. Therefore, the electrolyte layer 200 may also be formed as a uniform thin film.

After the electrolyte layer 200 is formed, a step S300 for forming the anode 300 on the electrolyte layer 200 is performed. The anode 300 may be Al foil, Si, Sn, $Li_4Ti_5O_{12}$, $SnSiO_3$, $SnO_2$, $TiO_2$, $Fe_2O_3$, $Fe_3O_4$, CoO, $Co_3O_4$, CaO, MgO, CuO, ZnO, $In_2O_3$, NiO, $MoO_3$, or $WO_3$, which is light and has a low density, a very low standard reduction potential, and a high energy density, and which may be used alone or in combination of two or more thereof.

Furthermore, a step S400 for forming the anode current collector 400 on the anode 300 may be performed. The anode current collector 400 may be a general metal thin film. For example, any one of Cu, Ni, Li, stainless steel, and Al, or an alloy thereof may be used.

As illustrated in FIG. 5B, it can be seen that the cathode substrate 100 is configured with the base 110 and the cathode 130 overlapping each other. Thus, the cathode substrate 100 may act as a support and a cathode for the all-solid-state battery 1 at the same time.

Figure 6A:
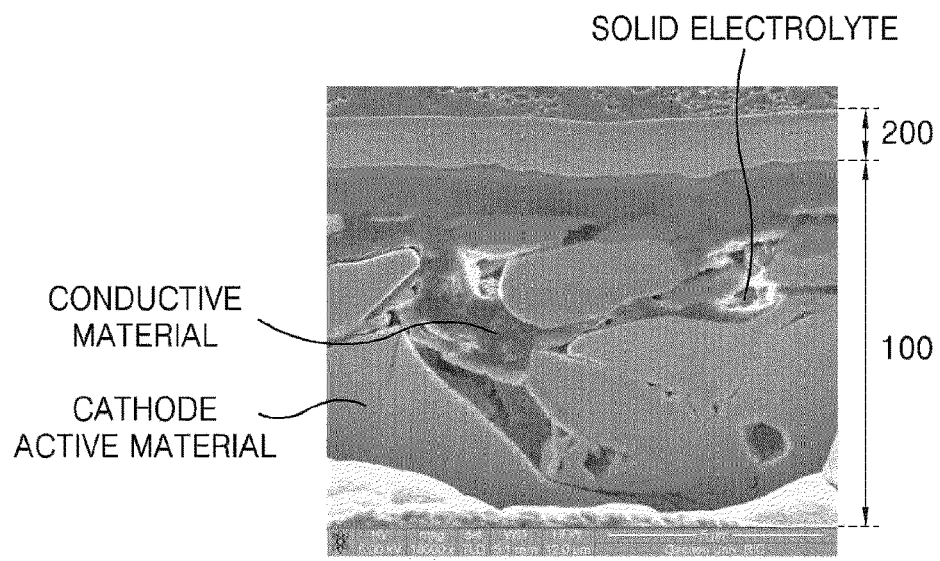
FIGS. 6A to 6C are SEM images showing the cross section and the surface of an all-solid-state battery and a cathode substrate.
Figure 6B:
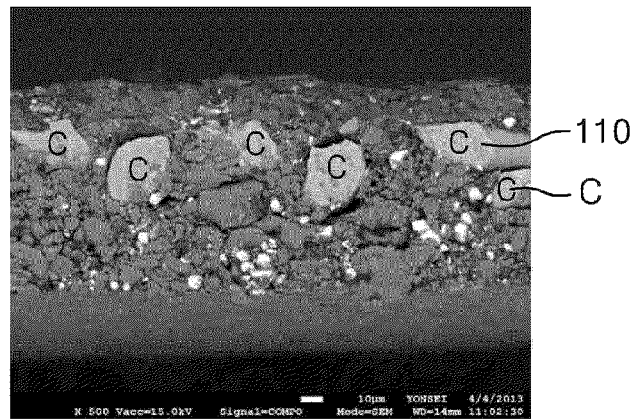
Figure 6C:
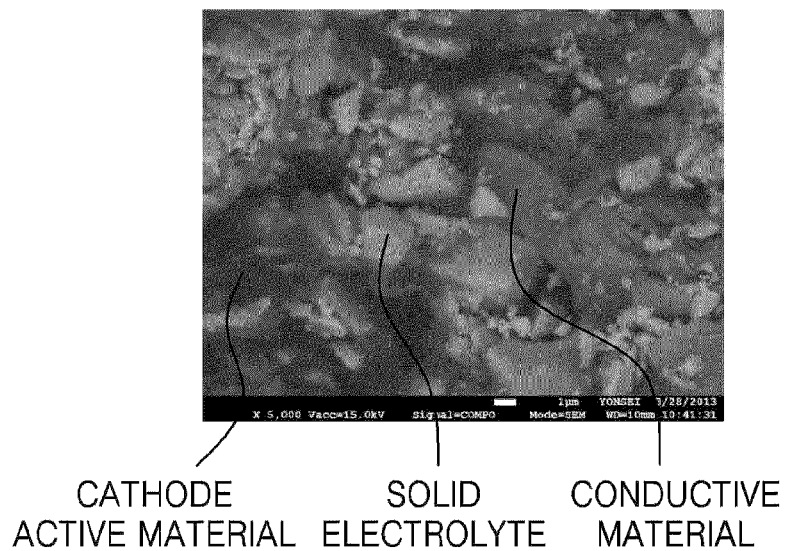

As described above, the prepared cathode substrate 100 and the all-solid-state battery 1 can be seen with reference to FIGS. 6A to 6C. FIGS. 6A to 6C are SEM images showing the cross section and the surface of an all-solid-state battery and a cathode substrate. FIG. 6A is an SEM image of a partial cross section of an all-solid-state battery according to an embodiment of the present invention. FIG. 6B is an SEM image of the cross section of a cathode substrate according to an embodiment of the present invention. FIG. 6C is an SEM image of the surface of the cathode substrate.

First, it can be seen from the cross section of the all-solid-state battery 1 in FIG. 6A that the electrolyte layer 200 is smoothly formed on the cathode substrate 100. Also, it can be seen that the cathode substrate 100 contains an anode active material, a solid electrolyte, and a conductive material.

The cathode substrate 100 can be seen in more detail with reference to FIGS. 6B and 6C. The cathode substrate 100 was prepared in such a way that a cathode material slurry in which LCO, LLTO, and CNT, which were respectively used as a cathode active material, a solid electrolyte, and a conductive material, were mixed at a ratio of 8:1.7:0.3 with 10% or less of an organic solvent (NMP) and a binder (PVDF), was applied on a base 110, which has a mesh form made of stainless steel, and then a drying step for evaporating the solvent and a compressing step for equalizing the surface were performed. That is, the cathode substrate 100 was prepared by the aforementioned method for manufacturing a cathode substrate. From the examination of the prepared cathode substrate using scanning electron microscope (SEM), it can be seen that the base and the cathode are formed overlapping each other in the cathode substrate. That is, it can be seen that while empty spaces in the mesh base are being filled with a cathode, cathode materials surround the base 110 and C to form the cathode substrate 100, and the cathode active material, the solid electrolyte, and the conductive material, which constitute the cathode, are evenly distributed throughout the cathode substrate. In this case, CNT, which is used as a conductive material, is included in a small amount in the cathode material compared to the cathode active material and the solid electrolyte, so that it is not easy to observe CNT in the SEM image of the surface of the cathode substrate 100. However, CNT is distributed in relatively dark regions in the SEM image of the surface.

Figure 7:
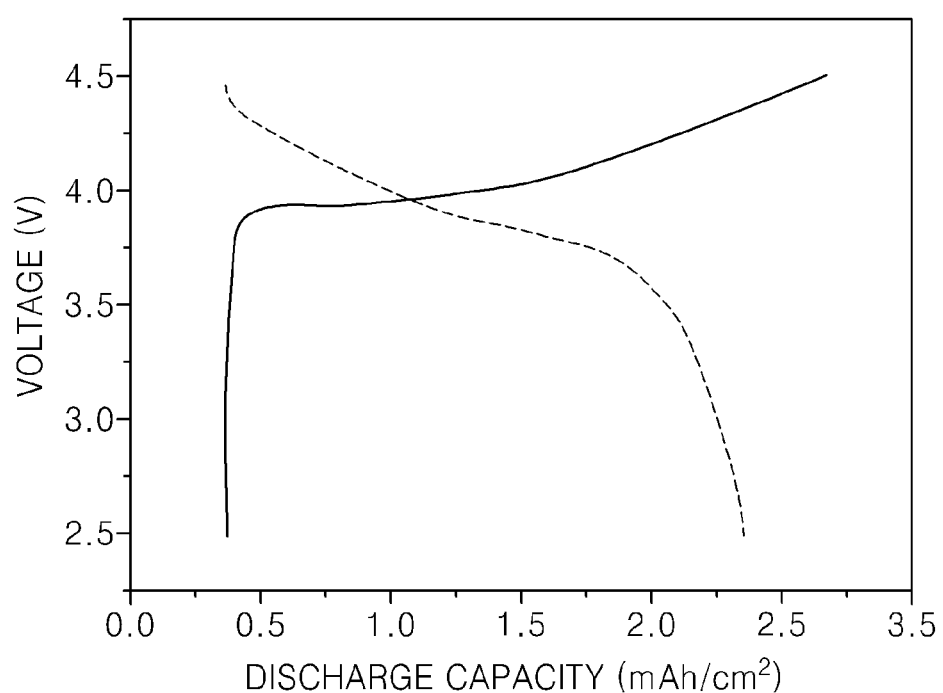
FIG. 7 is a graph showing a capacity change according to a charge/discharge voltage range for an all-solid-state battery in accordance with an embodiment of the present invention.

A capacity change of the all-solid-state battery manufactured by the aforementioned method is illustrated in FIG. 7.

FIG. 7 is a graph showing a capacity change according to a charge/discharge voltage range for an all-solid-state battery having a cathode substrate prepared in accordance with an embodiment of the present invention.

Referring to FIG. 7, an all-solid-state battery 1 is manufactured using the cathode substrate 100 prepared according to an embodiment of the present invention. And then, the capacity change according to a charge/discharge voltage range was measured using the all-solid-state battery 1.

The charge/discharge voltage range of the all-solid-state battery 1 was 2.5 to 4.5 V, and the current density thereof was about 1.1 mAh/cm$^2$. It can be seen that the all-solid-state battery 1 of the present invention exhibits a discharge capacity of about 2.0 mAh/cm$^2$. Thus, it can be seen that the cathode substrate of the present invention may be applied to an all-solid-state battery.

As described above, an important feature of the all-solid-state battery manufactured according to an embodiment of the present invention is to provide an all-solid-state battery in which a cathode substrate capable of acting as a cathode is applied as a substrate of the battery.

Therefore, the cathode substrate acts as a support constituting a battery, and also acts as a cathode active material by forming the substrate while empty spaces in a mesh base are being filled with a cathode material. Thus, the battery according to the present invention is capable of decreasing the distance between an electrode and a cathode, and contains a large amount of cathode material in the same volume as in a conventional battery, so that the present invention is capable of realizing a high capacity battery.

Although the present invention been described with reference to the drawings and the preferred embodiments, it is not limited thereto, but limited by the appended claims. Therefore, those skilled in the art can make various modifications and changes to the present invention without departing from the spirit and scope of the present invention defined by the appended claims.

SEQUENCE LISTING

1: All-solid-state battery
100: Cathode substrate
10: Base
130: Cathode
200: Electrolyte layer
300: Anode
400: Anode current collector

What is claimed is:

1. A method for manufacturing a cathode substrate; the method comprising:
   a) preparing a base in a mesh form;
   b) preparing a cathode slurry including a cathode active material, a solid electrolyte, and a conductive material;
   c) applying the cathode slurry on the base to form a cathode; and
   d) preliminarily drying the cathode slurry applied on the base in a temperature range of 50 to 120°C. and preliminarily compressing the cathode slurry to the base by pressing in a pressure range of lower than a pressure range of 700 to 1,200 kg/m$^2$; and
   e) drying the cathode slurry that is preliminarily compressed to the base in a temperature range of 500 to 1,200°C. and compressing the cathode slurry to the base by pressing in the pressure range of 700 to 1,200kg/M$^2$ for 5 minutes to 2 hours.

2. The method of claim 1, wherein the cathode slurry is formed by mixing the cathode active material, the solid electrolyte, and the conductive material with an organic solvent and a binder.

3. The method of claim 2, wherein at least any one of LiCoO2, LiNiO2, LiMn2O4, LiMnO2, LiCoPO4, or a compound thereof is used as the cathode active material.

4. The method of claim 2, wherein at least any one of an Li—La-metal-O system, an Li—B—O system, or an Li—P—O system, which is a crystalline electrolyte or an amorphous electrolyte, is used as the solid electrolyte.

5. An all-solid-state battery, comprising:
   the cathode substrate produced by the method of claims 1;
   an electrolyte layer formed on at least one surface of a cathode included in the cathode substrate;
   an anode formed on the solid electrolyte; and
   an anode current collector formed on the anode.

6. A method for manufacturing an all-solid-state battery, the method comprising:
   preparing a cathode substrate produced by the method of claims 1;
   forming an electrolyte layer on at least one surface of the cathode substrate;
   forming an anode on the electrolyte layer; and
   forming an anode current collector on the anode.

* * * * *